Figure 1:
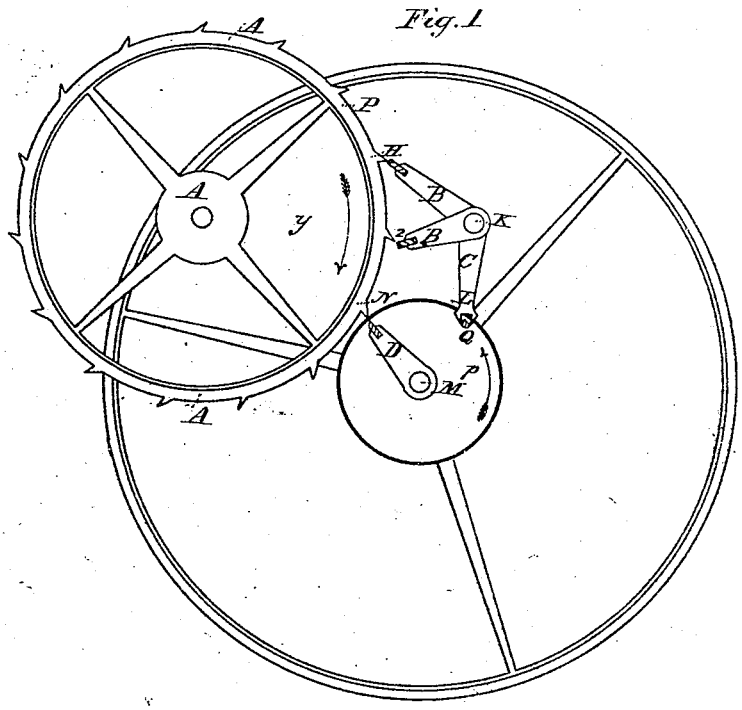
Figure 2:
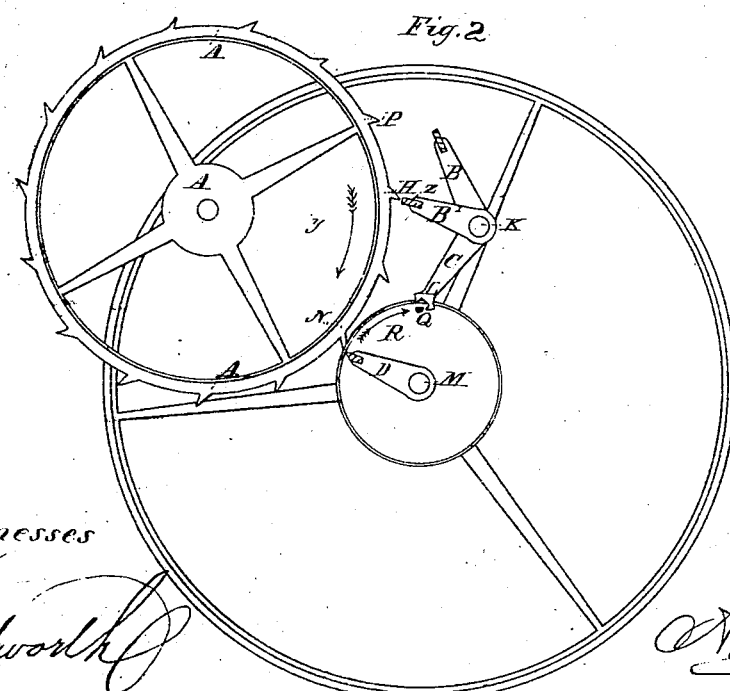

A. H. Potter.
Chronometer-Escapement.

N° 73646. Patented Jan. 21, 1868.

Witnesses
Woodworth
Theodore W. Burger

Inventor
A. H. Potter

United States Patent Office.

ALBERT H. POTTER, OF WILLIAMSBURG, NEW YORK.

Letters Patent No. 73,646, dated January 21, 1868.

---

IMPROVEMENT IN CHRONOMETER-ESCAPEMENT.

---

*The Schedule referred to in these Letters Patent and making part of the same.*

---

TO ALL WHOM IT MAY CONCERN:

Be it known that I, ALBERT H. POTTER, of Williamsburg, in the county of Kings, in the State of New York, have invented a new and useful Escapement for Watches and other Time-Pieces; and I do hereby declare that the following is a full, clear, and exact description of the construction and operation of the same, reference being had to the annexed drawings, making a part of this specification.

A A A, Figure I, are the escapement-wheel, similar in its construction to the ordinary chronometer-wheel, except that it has shorter and more obtusely-pointed teeth. B is a pallet, which serves to lock and unlock only. B' is a pallet, which serves to lock and impulse. C is a lever, which, with its fork L and pin Q, is the same in construction as in the ordinary lever-escapement. The pallets B B' and lever C are rigidly attached to the arbor K, which is pivoted into the plates of the movement. The roller R is rigidly attached to the arbor M. D is an impulse-pallet, also rigidly attached to the arbor M.

The operation of the escapement is as follows: The escape-wheel, Fig. I, is bearing in the direction shown by the arrow $y$. The tooth H is represented as locked on the pallet B, where it will remain until the pin Q (which is set in the roller R) enters the fork L in the direction shown by the arrow $p$, carrying the lever C with it. It will be perceived that as the pallets B and B' are rigidly attached to and move on the same centre with the lever C, the tooth H will now be disengaged from its locking at B, and the escape-wheel, being thus set free, will advance, and the tooth N drop on the pallet D, which will have arrived at that moment in a position to receive the tooth N and its consequent impulse. At the termination of this impulse, the escapement will assume the position as shown in Figure II, the tooth H now being locked by the pallet B', in which condition it will remain until the force of the impulse and momentum of the balance are overcome by the resistance of the pendulum or hair-spring, (not shown,) and the motion of the roller R and pallet D is reversed, and the pin Q enters the fork L in the direction of the arrow, and carries the lever C so far as to allow the flat end of the pallet B' to slide past the point of the tooth H, when it will be unlocked, and the face of the tooth will press against the back face, Z, of the pallet B', thus effecting an impulse which is transferred to the roller R through the medium of the lever C, fork L, and pin Q. At the termination of this impulse, the next tooth, P, will lock on the pallet B, as in Fig. I.

It will be seen that, although I employ the lever C and fork L, as in the ordinary lever-escapement, yet the impulse communicated through it differs very widely from said lever-escapement, inasmuch as in my escapement the construction, arrangement, and operation of the pallet B' is such as to do away with incline-plane impulse-pallets, which are employed in the ordinary lever-escapements, thus obviating the necessity of oil, which is a very desirable end to attain in an escapement. Another advantage in my escapement is, that the nature of its construction and operation admits of short and stubby teeth for the escape-wheel, thus affording strength and durability.

A point of merit which my escapement possesses over the ordinary chronometers is, that while their impulses in one direction are similar, mine has also an impulse in the opposite direction, which is not the case with the ordinary chronometer, thus obviating the liability of stopping or becoming set, from causes such as jars or knocks, while being handled or carried in the pocket.

The particular kind of impulse of the chronometer-escapement is admitted as good and desirable; but as its impulse is confined to one direction only, and as it is necessary in that escapement to employ two delicate springs, which are troublesome to construct and keep in repair, it therefore comes far short of a perfect escapement. In my device I produce the chronometer-impulse in one direction, besides an impulse in the opposite direction; and all this I accomplish in a simple and substantial manner, without the use of springs or other tenuous equivalents.

What I claim as my invention, and desire to secure by Letters Patent, is—

The pallets B and B', rigidly attached to the arbor K, in combination with the obtusely-pointed toothed escape-wheel A A A, lever C, fork L, pin Q, roller R, and pallet D, all constructed, arranged, and operating substantially as herein described and specified.

A. H. POTTER.

Witnesses:
T. W. BURGER,
J. WOODWORTH.